(12) United States Patent  (10) Patent No.: US 6,368,538 B1
Kitterman  (45) Date of Patent: Apr. 9, 2002

(54) METHOD OF MOLDING PLASTIC CONTAINER WITH PROTECTIVE METAL CORNERS

(76) Inventor: Gary L. Kitterman, 1302 Jasper, North Kansas City, MO (US) 64116

( * ) Notice: Subject to any disclaimer, the term of this patent is extended or adjusted under 35 U.S.C. 154(b) by 0 days.

(21) Appl. No.: 09/333,440

(22) Filed: Jun. 15, 1999

(51) Int. Cl.$^7$ ............................................. B29C 41/04
(52) U.S. Cl. ..................... 264/274; 264/277; 264/310; 425/DIG. 33
(58) Field of Search ................................ 264/277, 274, 264/310, 311; 425/DIG. 33

(56) References Cited

U.S. PATENT DOCUMENTS

| | | |
|---|---|---|
| 3,439,732 A | 4/1969 | Andreoli |
| 3,910,748 A | 10/1975 | Kopernik |
| 3,961,013 A | 6/1976 | Gutlhuber et al. |
| 4,264,016 A | 4/1981 | Speas |

FOREIGN PATENT DOCUMENTS

JP   406091657 A   *  4/1994
JP   410080925 A   *  3/1998

* cited by examiner

*Primary Examiner*—Jan H. Silbaugh
*Assistant Examiner*—Edmund H. Lee
(74) *Attorney, Agent, or Firm*—John C. McMahon

(57) ABSTRACT

A improved method of manufacturing plastic containers with molded-in metal inserts is employed to secure metal inserts to an interior of a rotary mold so that the inserts are automatically released from the mold when the article is removed from the mold. The method includes providing a mold having a magnet on the interior surface thereof, placing a metal insert in contact with the magnet, charging the mold with a quantity of a resin, biaxially rotating and heating the mold to melt and distribute the resin, cooling the rotating mold and removing a finished container with a molded-in metal insert. The mold rotates biaxially, about a first axis and a second axis which is perpendicular to the first axis. Preferably, the mold is constructed with magnets projecting from the outside through to the inner surface. The magnets present a concave curvate inner facing surface which mates with a convex curvate outer surface of a metal insert. The shank of an insert is shaped to include a circumferential groove which is filled with resin during the molding process to hold the insert in place after cooling.

23 Claims, 2 Drawing Sheets

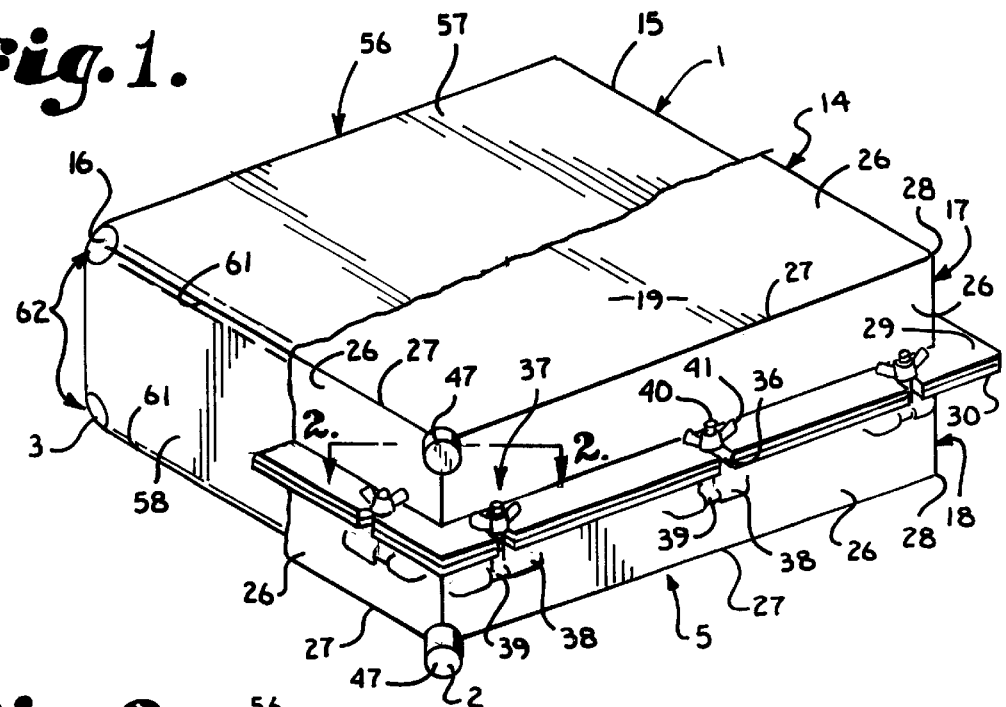

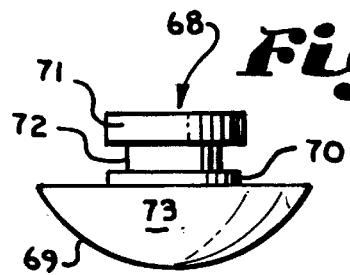
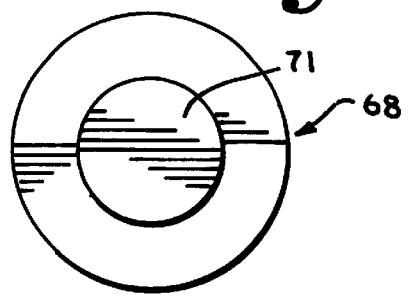
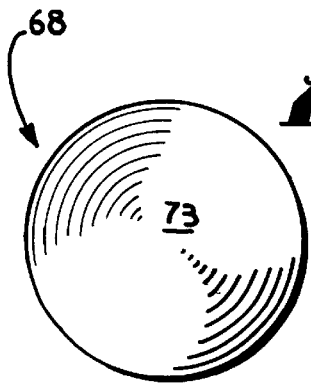
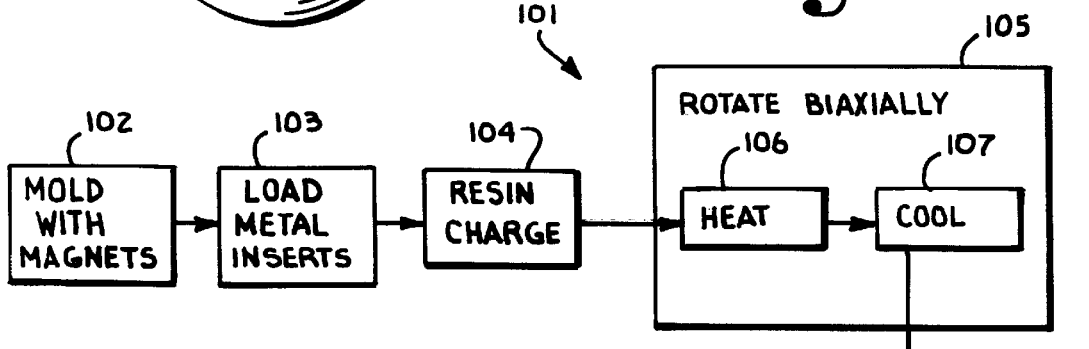
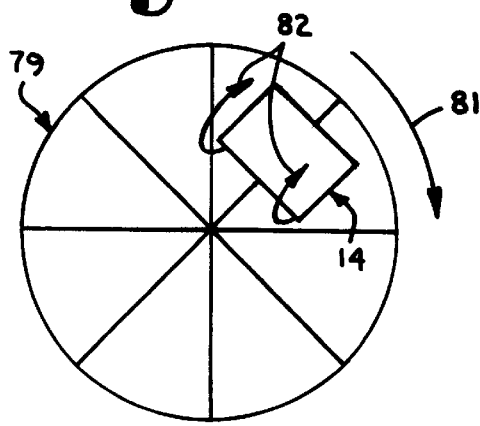

METHOD OF MOLDING PLASTIC CONTAINER WITH PROTECTIVE METAL CORNERS

BACKGROUND OF THE INVENTION

The present invention is broadly concerned with an improved method of manufacturing plastic containers with molded-in protective metal inserts, wherein the metal inserts are magnetically held in place relative to the mold during the molding process, while permitting automatic release of the inserts when the article is removed from the mold. More particularly, it is concerned with a method of molding plastic containers wherein metal inserts and a quantity of a plastic resin are loaded into a rotary mold equipped with magnets. The magnets secure the metal inserts in position during biaxial rotation and heating of the mold and release the inserts without damage when the finished container shrinks during cooling and/or is removed from the mold. Such molded-in metal inserts are particularly resistant to separation from the container and during use of the container effectively protect the container from excessive wear at the corners.

Rotary molded hollow plastic containers such as industrial waste containers, bins, buckets, storage tanks, drums, hoppers, trays and pans are used extensively. They are light weight, durable, impact resistant, corrosion free and are suitable for use in a wide range of temperature conditions. For these reasons, such containers are frequently used in the transportation industry. Airlines in particular, require containers for the collection of galley waste which are light weight, sized to fit the dimensions of the open spaces in the aircraft and which can endure rough handling by airline employees. Since such containers are often tilted and dragged across the tarmac for emptying, the corners are especially subject to wear. Durability of these containers can be enhanced without substantial additional weight by the addition of metal wear plugs or inserts at the outside corners and other areas of wear.

Although other methods such as vacuum forming or injection molding may be employed to manufacture containers of this type, rotational molding is particularly well adapted to the cost effective manufacture of large hollow containers, because rotational molding is a low pressure process capable of producing seamless large articles with generally uniform wall thickness, complex contours, molded-in graphics, a variety of molded-in colors and products with a good finish.

Rotary molding generally involves charging a hollow mold with a quantity of a liquid or powdered thermosetable plastic resin material, closing the mold and moving it into an oven wherein the mold is rotated while being heated. In particular, the mold is mounted on a spindle for biaxial rotation during the molding process. As the temperature of the mold and resin rises to the tack point of the resin, it adheres to the interior surface of the mold. Eventually, the resin flows together and evenly coats the interior surface of the mold. The mold is then moved into a cooling chamber, where rotation is continued as the mold is cooled, often by water spray or forced air. Shrinkage of the article within the mold normally occurs during cooling, and continued rotation of the mold serves to ensure that the shrinkage is uniform and does not result in distortion of the shape of the article, especially due to sagging.

Because the mold rotates about two axes from the time it is heated with the resin material therein until it is opened and the cooled article in a completed form is removed, any non-plastic insert to be molded into the article must be positioned in the mold and secured in place throughout the duration of the molding process. The insert must be secured with sufficient strength to withstand rotational forces which might cause it to be dislodged, but allows movement during shrinkage upon cooling and allows removal of the article from the mold.

Previous attempts to produce rotary molded articles with molded-in metal inserts employed threaded bolts or rods to secure the inserts to the mold during the molding process. The metal inserts were bored in order to receive threaded bolt fasteners. The mold itself was bored through to permit insertion of the bolts through from the outside of the mold for threading onto the inserts. Such methods have not proved to be satisfactory because failure to unscrew all of the bolt fasteners prior to opening of a mold could result in damage to the mold itself. In addition, such methods did not provide for release of the inserts upon shrinkage of the formed article during cooling. When shrinkage causes the article to pull away from the sides of the mold, the molded-in inserts strain against the bolts. Often such inserts are pulled out of the article before screws could be unscrewed from their fasteners and the article is cracked or otherwise damaged by the stress created.

Other manufacturing methods such as die casting and injection molding have employed magnets during a molding procedure. However, such applications do not employ magnets on the inner surface of a hollow mold to hold an insert in place during rotation of the mold.

U.S. Pat. No. 4,264,016 describes a drum assembly having preformed plastic inserts.

U.S. Pat. No. 3,961,013 describes a process for manufacturing pipe fittings by injection molding. A core containing a magnet is inserted into the mold to maintain a ring in place.

U.S. Pat. No. 3,910,748 describes a plastic mold construction in which magnets hold sections of the mold in place until they are otherwise attached.

U.S. Pat. No. 3,439,731 describes a die casting process using a magnetic core to position a tube.

SUMMARY OF THE INVENTION

The present invention overcomes problems previously outlined and that exist in the prior art, while providing a greatly improved method of manufacturing plastic articles or containers with molded-in metal inserts that are held in place during the initial molding procedure by magnets, but that are released by the magnet when forces are exerted by shrinkage of the container or during removal of the container from the mold. In particular, the method may be employed to secure or hold metal inserts in a selected position relative to the interior of a rotary mold, so that the inserts are automatically released from the mold when the article shrinks and/or is removed from the mold. The method includes providing a mold with at least one magnet located to be near the interior surface of the mold, placing a metal insert in the mold so as to be held in place by the magnet, charging the mold with a quantity of a thermoplastic resin, biaxially rotating and heating the mold to melt and distribute the resin evenly on the interior surface of the mold, cooling the rotating mold and thereafter removing a finished container with a molded-in metal insert therein.

Preferably, the mold is mounted on a spindle arrangement, which allows the mold to rotate simultaneously about a first axis, as well as a second axis which is perpendicular to the first axis. The magnets preferably extend into and present a concave curved inward facing surface to the interior of the mold, which facing surface is a smooth continuation of the mold interior surface and which mates with a convex curved outer surface of a metal insert.

The shank of each insert also preferably includes a circumferential groove which is filled with resin during the molding such that the resin in the groove solidifies in a tongue within groove relationship with the insert and the remainder of the container to help hold the insert in place.

Objects and Advantages of the Invention

The principal objects and advantages of the method of the present invention include: providing a method for molding protective metal inserts into plastic containers which method provides for holding the inserts in a desired position in the mold during a rotational molding process; providing such a method which secures the metal inserts to the mold during heating and allows release of the inserts from the magnets due to forces created during cooling, while rotating about two different axes; providing such a method which does not require the use of threaded bolts to hold the inserts to the mold; providing such a method which easily releases the metal inserts upon removal of the finished article from the mold or during shrinkage of the article upon cooling without worker intervention; providing such a method which employs magnets to secure the metal inserts to the mold; providing such a method which employs an elongate metal insert having a curvate outer facing surface; providing such a method which is suitable for use with a powder, prilled powder, micropellet or liquid synthetic resin material; providing such a method which is simple, efficient and economical to operate, which effectively produces a plastic container having molded-in metal inserts and which is particularly well-adapted for its intended purposes.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a perspective view of a finished plastic container with metal corner inserts located in a mold in accordance with the method of the invention with parts of the mold broken away to illustrate the container therein.

FIG. 2 is a fragmentary cross sectional view of the container positioned in the mold showing a mold magnet and a metal corner insert in an engaged position, taken along line 2—2 of FIG. 1.

FIG. 3 is a fragmentary cross sectional view showing the container and mold of FIG. 2 with the magnet and insert in a disengaged position.

FIG. 4 is an enlarged side view of the metal insert.

FIG. 5 is an enlarged top plan view of the metal insert.

FIG. 6 is an enlarged bottom plan view of the metal insert of FIG. 4.

FIG. 7 is a schematic depiction of a rotational molding process in accordance with the method of the invention.

FIG. 8 is a schematic depiction of a rotary spindle with a loaded and charged mold in place, with the spindle rotating on a primary axis and the mold rotating on a secondary axis perpendicular to the primary axis.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The present invention is directed to a method for molding a set of protective metal corners or inserts 3 into a finished plastic container generally represented by the reference numbered 1. The method broadly includes the steps of providing a mold assembly 5 having magnets 2 positioned at selected locations in the mold assembly 5, loading the mold assembly 5 with the inserts 3, such that each of the set of inserts 3 are held in a selected position in the mold 1 assembly 5 by respective magnets 2, charging the mold assembly 5 with a plastic resin material, rotating the mold assembly 5 while subjecting it to heating and cooling, and removing a formed container from the mold assembly 5.

The mold assembly 5 includes a mold 14 of the type illustrated in FIG. 1, with parts broken away to show a completed trash container 15 prior to removal from the mold 14 with a plurality of individual molded-in metal corner inserts 16 located in at least each of the lower corners thereof that has been constructed in accordance with the method of the present invention. The mold 14 is constructed of a suitable metal or other heat resistant substance to include first and second sections 17 and 18, each presenting an outer surface 19 and an inner surface 20. Each of the sections 17 and 18 has a plurality of walls 26 surrounding an interior cavity, which are conjoined at margins 27 and corners 28.

The mold sections 17 and 18 further include first and second respective circumscribing parting flanges 29 and 30 which extend perpendicularly outwardly from the walls 26 whereat adjacent walls 26 abut. Each of the flanges 29 and 30 is equipped with a series of mated, outward opening slots 36. First and second mold sections 17 and 18 are intercoupled when in a molding configuration by a series of clamp assemblies 37, each including a hinge 38 of integral construction with the walls 26, a generally T-shaped hinge pin 39 having a threaded end 40, and a wing nut 41. The clamp assemblies 37 are located adjacent the parting flanges 29 and 30 so that the hinge pins 39 register with the slots 36 when the pins are rotated toward the adjacent mold section 17 as depicted in FIG. 1. Wing nuts 41 are tightened on the treaded ends 40 of the hinge pins 39 to clamp the mold sections 17 and 18 together during the molding process. As those skilled in the art will appreciate, any of a number of other clamp assemblies 37 known in the molding arts may be substituted for the particular assembly described herein.

As best shown in FIGS. 2 and 3, magnets 47, that are of generally cylindrical construction are coupled with mold sections 17 and 18 so as to present an outer or exterior portion 48 and an inner or exterior portion 49 which extends between the outer and inner mold surfaces 19 and 20. The inner magnet portion 49 presents a concave curvate end surface 50, preferably having the same radius of curvature or shape as the inner surface of the mold 20 at its corner 28 so as to blend smoothly therewith. The magnets 47 may be constructed of any suitable material for maintaining a high Gauss magnetic field especially a permanent magnet. Electromagnets may also be employed.

The molded container, such as the illustrated trash container 56 may be constructed of any suitable thermomoldable plastic material such as high density polyethylene, medium density polyethylene, low density polyethylene, cross-linked polyethylene, polypropylene, polycarbonate and polystyrene, with the polyethylenes being particularly preferred. The container 56 has a plurality of rectangular walls 57 and a bottom 58 and presents an outer surface 59 and an inner surface 60. The walls are conjoined with each other or with the bottom 58 at edges or margins 61 and at corners 62.

The individual protective corner inserts 16 are constructed of circular metal plugs 68 sized and shaped to protect the corners 62. The inserts 16 are each respectfully positioned at one of the corners 62 of the container 56. Each insert 16 includes a generally rounded head portion 69, a shank portion 70 and a foot portion 71 with the foot portion 71 being separated from the remainder by a circumferential groove 72. The head portion 69 has a convex curvate surface 73 having a radius of curvature complementary to the magnet end surface 50. Those skilled in the art will appreciate that inserts 68 might also be constructed with a head portion 69 having a more elongate geometric configuration suitable for use along the margins 61 of the container.

Shown in FIG. 7 is a schematic or block diagram showing process steps identified by blocks for making a container 56 in accordance with the invention. In particular, this process schematic is generally identified by the reference numeral 101. In the process schematic 101, the block 102 represents a first stage wherein the mold assembly 14 is provided and has positioned therein the magnets 47 which are fixed in corners 62 of the mold assembly 14. In the second stage, represented by the block 103, the inserts 68 are manually positioned (in the location shown in FIG. 2) to be held in place by the magnets 47. In the third stage represented by the block 104, plastic forming resin powder or the like is charged into the mold assembly 14.

Fourth and fifth stages are represented by the blocks 106 and 107 respectfully and both occur in an oven generally represented by the reference number 105. In the fourth stage 106, the mold assembly 14 is loaded into a biaxially rotatable structure within the oven 105 to which heat is applied. In the fifth stage 107, the mold assembly 14 and resulting container 56 are cooled under rotation. Thereafter, in a sixth stage, represented by the block 108, the newly made container 56 is removed from the mold assembly 14 after the mold assembly 14 is removed from the oven 105.

In accordance with the method of the invention, the mold assembly 14 having a plurality of magnets 47 positioned on the interior surface 20 of the corners 28 is mounted on the spindle 79. The mold assembly 14 is loaded with a plurality of protective metal corner inserts 68, the head surfaces 73 of which are each positioned in contacting registry with a magnet end surface 50. The mold 14 is charged, preferably with a premeasured quantity of a thermoplastic resin material, as represented by the block 104. The resin material may be in granule, powder, prilled powder, micropellet, a plastisol dispersion, liquid, gel or any other suitable form. Measured quantities of a fungicide, colorant such as a dry mix or precompounded colorant, and a flame retardant or other additive may also be included along with the resin charge and the mold 14 is clamped shut.

The spindle 79 supporting the charged mold 14 are rotated so that the spindle 79 rotates about a primary axis the rotation of which is represented by the arrow 81 and the mold is rotated about a secondary axis the direction of rotation of which id represented by the arrow 82, perpendicular to the primary axis. The magnetic field established by each magnet 47 maintains each of the inserts 68 in its respective position within the mold 14 throughout the rotational molding operation, that is, the forces created by rotation of the mold 14 are insufficient to disengage each insert 68 from respective magnets 47.

The rotating spindle 79 and mold 14 are positioned in an oven 106 operated at a selected temperature designed to melt, liquify or otherwise cause the resin to become adherent to itself. In the oven 106 the charged mold 14 continues to rotate biaxially. The heat of the oven 106 penetrates the mold 14, causing powdered plastic resin material to reach a temperature at which the material melts and becomes tacky as it forms a homogenous layer of densified molten plastic which abuts the inner surface 20 of the mold 14 in covering relationship, as well as to each shank 70 and foot 71 of each metal insert 68, filling in each associated circumferential groove 72. Centripetal forces in association with the continued rotation of the mold 14 cause the resin material to evenly coat the walls of the mold 14 to form a molded container 56 having walls 57 of generally uniform thickness.

Following heating of the charged mold 14 for a predetermined period of time or to a predetermined temperature associated with the resin utilized, the rotating spindle 79 with an associated charged and heated mold 14 are moved into a cooling chamber 107 for cooling to a predetermined temperature. Cooling may be accomplished by spraying the mold 14 with water or forced air, or by circulating liquid inside the container 56 within the mold 14 for a predetermined period of time. The spindle 79 and mold 14 continue to rotate so that the molded container 56 does not sag away from the inner surface 20 of the mold, causing deformation. During cooling, the container 56 may shrink somewhat. If the shrinkage is very substantial, the forces acting on the container 56 may overcome the magnetic forces holding one or more of the insert head surfaces 73 in contact with a respective magnet end surface 50, thereby causing the insert 68 to disengage from the mold assembly 14 without damage to either.

Upon completion of the predetermined cooling cycle, the spindle 79 and its associated mold 14 are removed from the cooling chamber 7 and rotation is stopped. The mold 14 is then opened and a container 56 with molded in inserts 68 is removed. The molded container 56 may then be subject to final finishing steps which may include trimming, drilling, punching of cut-outs, installation of fittings and sealant or the like.

It is to be understood that while certain forms of the present invention have been illustrated and described herein, it is not to be limited to the specific forms or arrangement of parts described and shown.

What is claimed and desired to be secured by letters patent is as follows:

1. A method of molding a plastic container so as to incorporate a protective metal insert in the container, comprising:

a) providing a mold having an interior surface and including positioning a magnet having a first curved inward facing surface in a corner of the mold;

b) providing the protective metal insert with a second curved surface and positioning the protective metal insert, such that said first and second curved surfaces mate and magnetically join, so as to magnetically hold said insert in position relative to the mold against rotational forces applied to said mold;

c) adding an amount of a resin material to said mold sufficient to form the container;

d) biaxially rotating and heating said mold, while heating, for melting and generally evenly distributing said resin material on the interior surface of the mold;

e) cooling said rotating mold; and f) removing the plastic container having a molded-in metal insert from said mold.

2. The method of claim 1 wherein the mold is a rotary mold.

3. The method of claim 1 wherein said magnet is a permanent magnet.

4. The method of claim 1 further including the step of positioning a plurality of said metal inserts against respective magnets in respective corners of said mold.

5. The method of claim 1 including the step of providing an insert wherein:

a. said metal insert includes a head operably coupled with a shank and a foot; and including the step of b. flowing said resin material around said shank and said foot in covering relationship, thereby securing said metal insert into the container subsequent to cooling.

6. The method of claim 1 further including the step of positioning a plurality of said metal inserts against respective magnets along the interior surfaces of said mold for protecting the edges of a molded plastic container.

7. The method of claim 1 including the step of selecting the resin of step c from the group consisting of high density polyethylene, medium density polyethylene, low density polyethylene, cross-linked polyethylene, polypropylene, polycarbonate, polystyrene and mixtures thereof.

8. The method of claim 1 further including the step of adding to said mold a quantity of at least one additive selected from the group consisting of fungicides, colorants and flame retardants.

9. The method of claim 1 further including the step of permitting the cooled plastic container to shrink within said mold thereby allowing at least some of said metal inserts to disengage from said magnets.

10. The method of claim 1, wherein said cooling step further includes the step of subjecting the mold to a cooling spray with a cooling material selected from the group consisting of water and compressed air.

11. The method of claim 1 including the step of projecting said magnet through a wall of said mold and thereafter securing said insert directly to said magnet.

12. In a method of rotationally molding a plastic container wherein a mold having an interior surface forming a mold cavity is charged with a quantity of a resin material, the mold is heated and rotated biaxially to melt and evenly distribute the resin material, the mold is cooled while maintaining biaxial rotation, and the mold is then opened to release a molded plastic container, the improvement comprising:

a) providing a plurality of magnets with each of said magnets having a respective first curved surface;

b) positioning said magnets so as to be fixed in position relative to the mold interior surface and such that said first curved surfaces project inwardly with respect to the mold;

c) providing a plurality of metal inserts with each of said inserts having a respective second curved surface and with each of said second surfaces being sized and shaped to mate with respective first curved surfaces;

d) positioning said metal inserts in said mold in association with a respective magnet, such that said first and second surfaces of each associated magnet and insert mate, so said inserts are each held in a selected position in said mold by said respective magnets during said rotational molding process.

13. The method of claim 12 including the step of:

a. positioning said magnets such that an inner surface of said magnet extends through a wall of said mold so as to open said mold cavity.

14. The method of claim 13 including the steps of:

a. providing each of said magnet inner surfaces with a first arcuate curvature; and b. providing each of said inserts with a second arcuate surface matable with the first arcuate curvature of respective magnets.

15. The method of claim 12 including providing permanent magnets as said magnets.

16. The method of claim 12 further including the step of installing said magnets into the corners of the mold.

17. The method of claim 12 including the step of providing each of a. said metal inserts with a head operably coupled with a shank and a foot; and b. flowing said resin material around said shank and said foot in covering relationship, thereby molding said metal insert into the container.

18. The method of claim 12 further including the step of installing said magnets along the interior margin surfaces of said mold for receiving metal edge protectors.

19. The method of claim 12 including providing the resin material that is selected from the group consisting of high density polyethylene, medium density polyethylene, low density polyethylene, cross-linked polyethylene, polypropylene, polycarbonate, polystyrene and mixtures thereof.

20. The method of claim 12 further including the step of adding to said mold a quantity of at least one additive selected form the group consisting of fungicides, colorants and flame retardants.

21. The method of claim 12 further including the step of permitting the cooled plastic container to shrink within the mold so as to allow at least one of said metal inserts to disengage from a respective magnet.

22. The method of claim 12 wherein said cooling step further includes the step of subjecting the mold to a cooling with a cooling material selected from the group consisting of water and compressed air.

23. A method of molding protective metal corners in a plastic container, comprising:

a) providing a mold having an interior surface including a plurality of curved corners, each of said corners having a magnet presenting a concave inward facing surface having a radius of curvature and positioning each of said magnets in a respective corner of said mold;

b) providing a plurality of metal corner inserts, each of said inserts having a convex curvate end surface having the same radius of curvature as said magnet inward facing surfaces;

c) mating each of said magnet concave surfaces with a respective one of said metal corner insert convex surfaces;

d) adding a quantity of a resin material to said mold and securing it in a closed position;

e) heating said mold to a predetermined temperature for melting and evenly distributing said synthetic resin material on an interior surface of said mold;

f) rotating said mold about a first axis and a second axis while heating;

g) continuing to rotate said mold while cooling said mold; and h) opening said mold and removing a molded plastic container having molded-in metal corner inserts.

\* \* \* \* \*